S. SCOTTON.
PORTABLE CROSSCUT SAWING MACHINE.
No. 16,883.
PATENTED MAR. 24, 1857.
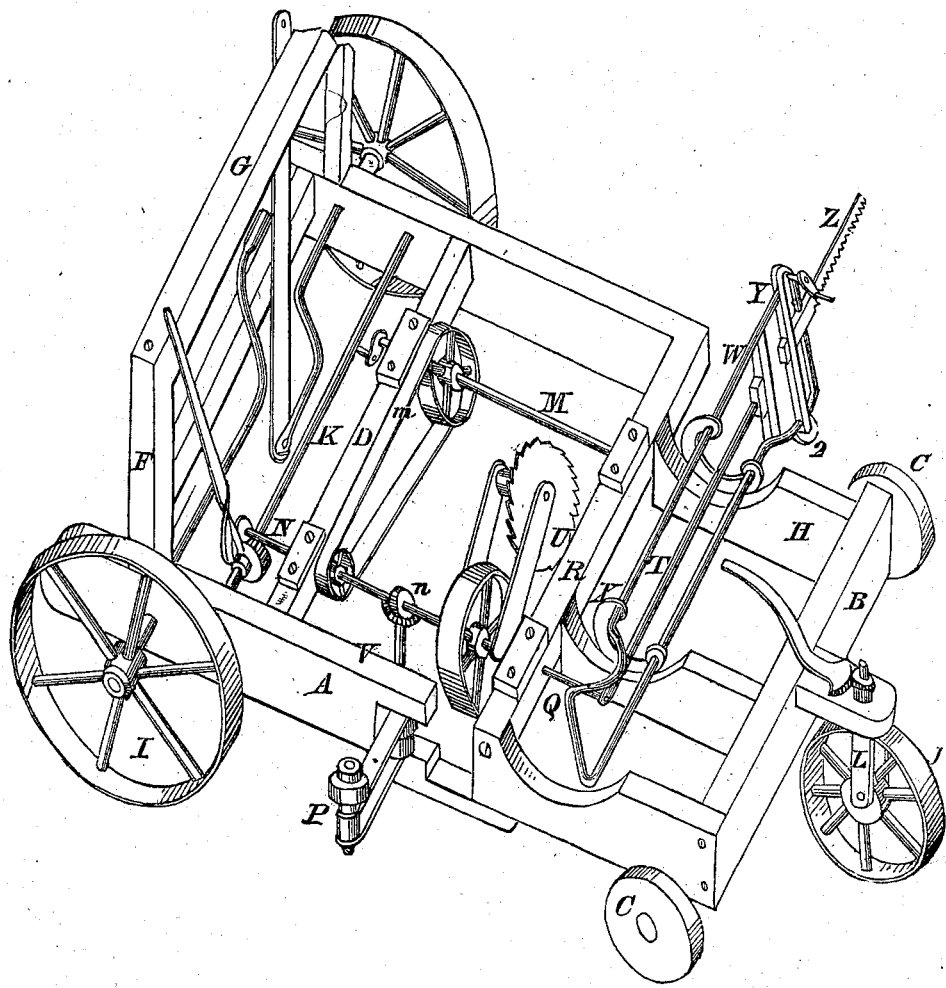
TAKEN FROM PATENT OFFICE REPORT
1857 - VOL. III.
ONLY DRAWING ACCESSIBLE (1912)

UNITED STATES PATENT OFFICE.

STEPHEN SCOTTON, OF RICHMOND, INDIANA.

PORTABLE CROSSCUT-SAWING MACHINE.

Specification of Letters Patent No. 16,883, dated March 24, 1857.

*To all whom it may concern:*

Be it known that I, STEPHEN SCOTTON, of the city of Richmond, in the county of Wayne and State of Indiana, have invented a new and useful Machine for Sawing Cord-Wood, Cooper-Stuff, and other Timber; and I do hereby declare that the following is a full and exact description of the same, reference being had to the accompanying drawings and to the letters of reference marked thereon.

The nature of my invention consists in placing a reciprocating saw upon a locomotive framework the engine being placed at right angles with the line of motion of the carriage. The saw slides being borne in adjustable guides which allow it to be used in a horizontal movement in felling trees and in a perpendicular for logging off. Together with two circular saws in swinging frames the one swinging horizontally, the other perpendicularly.

To enable those skilled in the arts to make and use my invention I will proceed to describe its construction, and the mode of its operation.

A, A', are the two sides of the framework of the carriage upon which the machinery is borne. The side A has a peculiar shaped opening near its middle to admit of the free vibration of saw frames O, P. Near its forward end there is a concave recess to allow of the adjustment of saw frame W, in both a horizontal and perpendicular position. Near their rear ends the sides A, A', severally receive journals of shaft K.

B, is the forward transverse bar of the frame. It is secured to the side A and to longitudinal pieces H H. It has a projection $b$, in front which receives the upright shaft, $l$, of the wheel frame, L.

C, D, E, are also transverse bars, their ends are secured in sides A A'.

F F are upright posts at the rear of the carriage, bearing the cap G.

H, H, are longitudinal pieces connecting the bars, B, and C, they have concave recesses similar to A.

I, I, are two driving wheels whose hubs fit loosely upon shaft K. They have clutches $i, i$, by means of which they may be made to revolve with said shaft. J is the front wheel. It has a fixed axle rotating with the hub. It is retained in the frame L.

K, is the axle of the wheels, I, I. It has bearings in the sides A, A', and near the side A is pinion $k'$, which is actuated by the worm or screw $n'$.

$k'$ is a lever by which pinion $k$ is moved in and out of gear with worm $n'$.

$i'$, is a lever by which clutches, $i, i,$ are thrown in and out of gear.

$i'', i'''$ are two rods connecting lever $i'$ with clutches $i, i$. Rod $i''$ may be lifted up and freed from lever $i'$ thereby allowing the engineer to use either one of the clutches separately in turning the carriage.

$b'$, is a lever with a toothed segment meshing in pinion $l'$. By means of this arrangement the engineer is enabled to direct the carriage at will.

$f$, is a brake by which the wheels I, I, may be suddenly checked. It is operated by lever $f'$.

M, is the crank shaft of a steam engine. It has upon it the crank $m'$, and the pulley $m$ which communicates motion to the shaft N, by means of belt and pulley $n$. It revolves in proper boxing in cross bars C, D.

N is a long shaft having bearings in C, D, E. It communicates motion to the driving wheels I, I, by means of the worm, $n'$, and pinion $k$. It drives pulley $p$ by means of bevel gear $n''$. And saw, $o$, by a belt from pulley $m'''$, and may communicate motion to the crank shaft S, by means of the sliding band Q.

O, is a swinging frame borne upon shaft N. As shown in the drawing it carries the saw, $o$, in its outer extremity, which describes an arc with shaft N as its center.

V is an iron rod which may be slid out so as to retain frame O, in a horizontal position for the purpose of sawing cordwood into proper stove length.

U is a frame which may be turned down and used as a saw table for saw, $o$.

P, is also a swinging frame having its plane of motion parallel with the horizon. It swings upon the shaft of pulley R, bearing in its outer end saw-mandrel and pulley, $p$, to which saw $o$, may readily be shifted, as indicated by the dotted lines, $o'$.

Q, is a sliding band connecting the shaft N with crank shaft. It is operated by forked lever R.

R is a lever by which the sliding band Q is moved.

S, is a crank operated by the sliding band Q. It is slitted through the hole which receives the shaft, and made to act upon said shaft as a clamp by means of a set screw.

By this arrangement the crank is allowed to turn upon the crank shaft if the saw should catch and the danger of breaking the saw obviated.

Y, is a pitman connecting the crank I, with the frame W, by means of a swivel joint, thereby allowing the frame to vibrate in a horizontal or perpendicular position.

W, is a saw frame vibrating horizontally. It is retained in semicircular guides X, X. It has a bend at the crank end to allow it to clear the crank. At the saw end are rods Y. Y, which serve as guides to block Z' of the saw Z.

Z, is a crosscut saw attached to block Z' and is used for cutting either horizontally or perpendicularly. It may be turned up when out of use.

1, is a pulley and ratchet combined.

5, is a winch upon the shaft of 1.

2, is a pulley at the lower ends of $y, y,$ and connects with 1 by an endless cord 3, which cord is also attached to block Z'. By this arrangement the saw may be moved on the rods Y, Y.

4 is a pawl upon the side A'. It comes in contact with the ratchet 1 when the saw is cutting in a horizontal direction in the backward part of the stroke, causing the pulley to turn, moving block Z' and thereby feeding the saw.

6, 6, are a pair of trucks which may be placed under the forward end of the carriage to run upon an ordinary railroad.

Operation: My machine is operated thus: For felling large trees the frame W is thrown down to its horizontal position, the ratchet, 1, in contact with the panel, 4. The saw is now brought in contact with the tree, and the trunk fairly sawed off. A wedge may be inserted behind the saw to prevent pinching. After the tree is felled the carriage is brought along side of the trunk at a proper length, the saw frame righted to the perpendicular position, the saw block Z' brought up to the upper end of the rods, Y, Y, by winch, 5, the saw may now be put in operation and the log sawed off the saw feeding itself by its own weight. When one "cut" is sawed off, the carriage is again moved, and thus on till the tree is cut up. Saw, o, in saw frame P is used for cutting down small trees. Saw, o, in frame O is used for cutting up small logs. If light the logs may be moved to the saw. Otherwise the machine is moved as for saw, Z.

This machine is worked by a light power; is convenient to move from place to place, provides its own fuel, is not likely to get out of order nor difficult of repair.

What I claim as my invention and desire to secure by Letters Patent is,

1. The combination of the saw, o, in swinging frame, O, in combination with the locomotive carriage A, A', B, C, D, E, F, F, G, &c. or equivalents for the purposes herein set forth.

2. I claim the combination of saw o, and frame, O, with the swinging saw-table, U, and sliding bar V, or equivalents, for purposes herein set forth.

3. I claim saw, o, in horizontal swinging frame P, in combination wth the locomotive carriages A A' B, C, D, E, F, F, G &c. for purposes herein set forth.

STEPHEN SCOTTON.

Witnesses:
  GEO. TAYLOR,
  JOHN FINLEY,
  JOHN W. FOULK.